(12) United States Patent
Naoi

(10) Patent No.: US 8,960,759 B2
(45) Date of Patent: Feb. 24, 2015

(54) VEHICLE BODY FRONT STRUCTURE

(75) Inventor: Daisuke Naoi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/805,053

(22) PCT Filed: Jun. 6, 2011

(86) PCT No.: PCT/JP2011/062912

§ 371 (c)(1),
(2), (4) Date: Dec. 18, 2012

(87) PCT Pub. No.: WO2011/162089

PCT Pub. Date: Dec. 29, 2011

(65) Prior Publication Data

US 2013/0099527 A1    Apr. 25, 2013

(30) Foreign Application Priority Data

Jun. 24, 2010  (JP) .................................. 2010-143871

(51) Int. Cl.
*B62D 25/08* (2006.01)
*B62D 25/14* (2006.01)

(52) U.S. Cl.
CPC ................ *B62D 25/08* (2013.01); *B62D 25/14* (2013.01); *B62D 25/145* (2013.01)
USPC ..................... 296/70; 296/193.09; 296/203.02

(58) Field of Classification Search
USPC ........................... 296/191, 193.09, 203.02, 70
See application file for complete search history.

(56) References Cited

FOREIGN PATENT DOCUMENTS

| JP | 62-108054 | 7/1987 |
|----|-----------|--------|
| JP | 63-168167 | 11/1988 |
| JP | 04-293660 | 10/1992 |
| JP | 8-175429 | 7/1996 |
| JP | 11-105737 | 4/1999 |
| JP | 2001-010537 | 1/2001 |
| JP | 2003-104237 | 4/2003 |
| JP | 2004-299633 | 10/2004 |
| JP | 2007-030627 | 2/2007 |
| JP | 2007-118636 | 5/2007 |
| JP | 2008-137419 | 6/2008 |
| JP | 2009073305 A * | 4/2009 |

OTHER PUBLICATIONS

International Search Report dated Aug. 4, 2011.
European Search Report dated Mar. 20, 2014, Application No. 11797975.7, 3 pages.

* cited by examiner

*Primary Examiner* — Glenn Dayoan
*Assistant Examiner* — Melissa A Black
(74) *Attorney, Agent, or Firm* — Rankin, Hill & Clark LLP

(57) ABSTRACT

A vehicle body front structure includes a brake master cylinder mounting surface that is formed in an arc shape toward a vehicle interior, a plurality of mounting surface beads that are formed on the brake master cylinder mounting surface only in a vertical direction and an inclined direction inclined with respect to the vertical direction, and a reinforcing plate that is joined to the plurality of mounting surface beads.

15 Claims, 9 Drawing Sheets

VEHICLE BODY FRONT STRUCTURE

BACKGROUND OF THE INVENTION

1. Field of the Invention

The present invention relates to a vehicle body front structure.

Priority is claimed on Japanese Patent Application No. 2010-143871, filed Jun. 24, 2010, the content of which is incorporated herein by reference.

2. Description of Related Art

In general, a vehicle body includes a cabin (vehicle interior) which occupants enter, an engine room that is disposed in front of the cabin and stores an engine and the like, and a dashboard (dash panel) that partitions the engine room from the cabin. Various components are mounted on the dashboard. Accordingly, various techniques, which increase the support stiffness for supporting these components, are disclosed.

For example, dashboard cross-members (dash cross-members) and a booster mounting reinforcement are often joined to the dashboard (dash panel). The booster mounting reinforcement is a reinforcing plate that reinforces a portion on which a brake booster is mounted.

Among these, there is a member that joins the middle portion of the dashboard cross-member in the width direction of a vehicle to a front end portion of a tunnel portion extending from the lower central portion of the dashboard. Further, there is a structure where the booster mounting reinforcement includes a reinforcement main body and a reinforcing arm portion extending inward from the reinforcement main body in the width direction of a vehicle and joined to the middle portion of a dash cross-member in the width direction of a vehicle (for example, see Japanese Unexamined Patent Application, First Publication No. 2007-30627).

According to the above-mentioned structure, it is possible to transmit a load, which is input to the booster mounting reinforcement, to the dashboard or the dashboard cross-member through not only the reinforcement main body but also the reinforcing arm portion, and to efficiently distribute the input load.

SUMMARY OF INVENTION

However, in the above-mentioned technique, it is necessary to form the reinforcing arm portion in order to distribute the load that is input to the booster mounting reinforcement. That is, there is a problem in that the size and weight of the reinforcing plate for increasing the support stiffness of the dashboard are increased.

SUMMARY OF THE INVENTION

The invention has been made in consideration of the above-mentioned circumstances, and an object of the invention is to provide a vehicle body front structure of which the size and weight of a reinforcing plate can be reduced while support stiffness is sufficiently ensured.

The following structure is employed to solve the above-mentioned problems.

A vehicle body front structure according to an aspect of the invention includes a brake master cylinder mounting surface that is formed in an arc shape toward a vehicle interior, a plurality of mounting surface beads that are formed on the brake master cylinder mounting surface only in a vertical direction and an inclined direction inclined with respect to the vertical direction, and a reinforcing plate that is joined to the plurality of mounting surface beads.

Since the brake master cylinder mounting surface is formed in the arc shape toward the vehicle interior as described above, it is possible to increase stiffness against a brake pedal force, which is an input load, as compared to a case where the brake master cylinder mounting surface is formed flat. Since the mounting surface beads are formed only in the vertical direction and the inclined direction and are not formed in the left-and-right direction, it is possible to suppress the bending deformation of the brake master cylinder mounting surface that is caused by a brake pedal force. For this reason, it is possible to increase the stiffness of the dashboard lower and to reduce the size and weight of the reinforcing plate.

A bent portion, which extends so as to be bent in a front-and-rear direction, may be formed at an upper edge of a dashboard lower; a plurality of bent portion beads may be formed at the bent portion; and ridgelines of at least one of the plurality of bent portion beads may continue to ridgelines of at least one of the plurality of mounting surface beads.

According to this structure, it is possible to increase the stiffness of the brake master cylinder mounting surface, the bent portion, and the connecting portion between the brake master cylinder mounting surface and the bent portion. Accordingly, it is possible to further increase the stiffness of the entire dashboard lower.

A plurality of reinforcing plate beads may be formed on the reinforcing plate, and ridgelines of the reinforcing plate beads may overlap the ridgelines of the mounting surface beads.

According to this structure, the beads are superimposed, so that it is possible to further increase the stiffness of the dashboard lower. Further, it is possible to transmit an input load to the vertical wall of the front glass support panel that is joined to the bent portion and has high stiffness. For this reason, it is possible to efficiently distribute a load.

The number of the bent portion beads may be set to be larger than the number of the mounting surface beads.

Here, since the extension length of the bent portion is set to be short, the length of each of the bent portion beads formed thereon also becomes short. However, it is possible to further increase the stiffness of the bent portion by increasing the number of the bent portion beads.

The number of the reinforcing plate beads may be set to be larger than the number of the mounting surface beads.

Here, when the size of the reinforcing plate is reduced, the length of each of the reinforcing plate beads formed thereon also becomes short. However, it is possible to increase the stiffness of the reinforcing plate while reducing the size of the reinforcing plate by increasing the number of the reinforcing plate beads.

The mounting surface beads may include a vertical bead that is formed along a straight line extending in a vertical direction and passing through a hole formed on the brake master cylinder mounting surface, and inclined beads that are formed along straight lines crossing the vertical bead and passing through the hole.

It is possible to increase the stiffness of the dashboard lower and to reduce the size and weight of the reinforcing plate due to the vertical bead and the inclined beads that are formed as described above.

The plurality of mounting surface beads may extend to the bent portion from the brake master cylinder mounting surface.

It is possible to increase the stiffness of the brake master cylinder mounting surface, the bent portion, and the connecting portion between the brake master cylinder mounting surface and the bent portion and to further increase the stiffness of the entire dashboard lower by the plurality of mounting surface beads that are formed as described above.

ADVANTAGEOUS EFFECTS OF INVENTION

According to the aspect of the invention, it is possible to sufficiently increase the support stiffness of a dashboard lower and to reduce the size and weight of a reinforcing plate.

DETAILED DESCRIPTION OF THE INVENTION (Vehicle Body Front Structure) (Dashboard Lower)

Next, an embodiment of the invention will be described with reference to the drawings. In the following description, the front side in the traveling direction of a vehicle may be simply referred to as the front side, the rear side in the traveling direction may be simply referred to as the rear side, the right side in the width direction of a vehicle may be simply referred to as the right side, the left side in the width direction of a vehicle may be simply referred to as the left side, the upper side in the direction of gravity may be simply referred to as the upper side, and the lower side in the direction of gravity may be simply referred to as the lower side.

Figure 1:
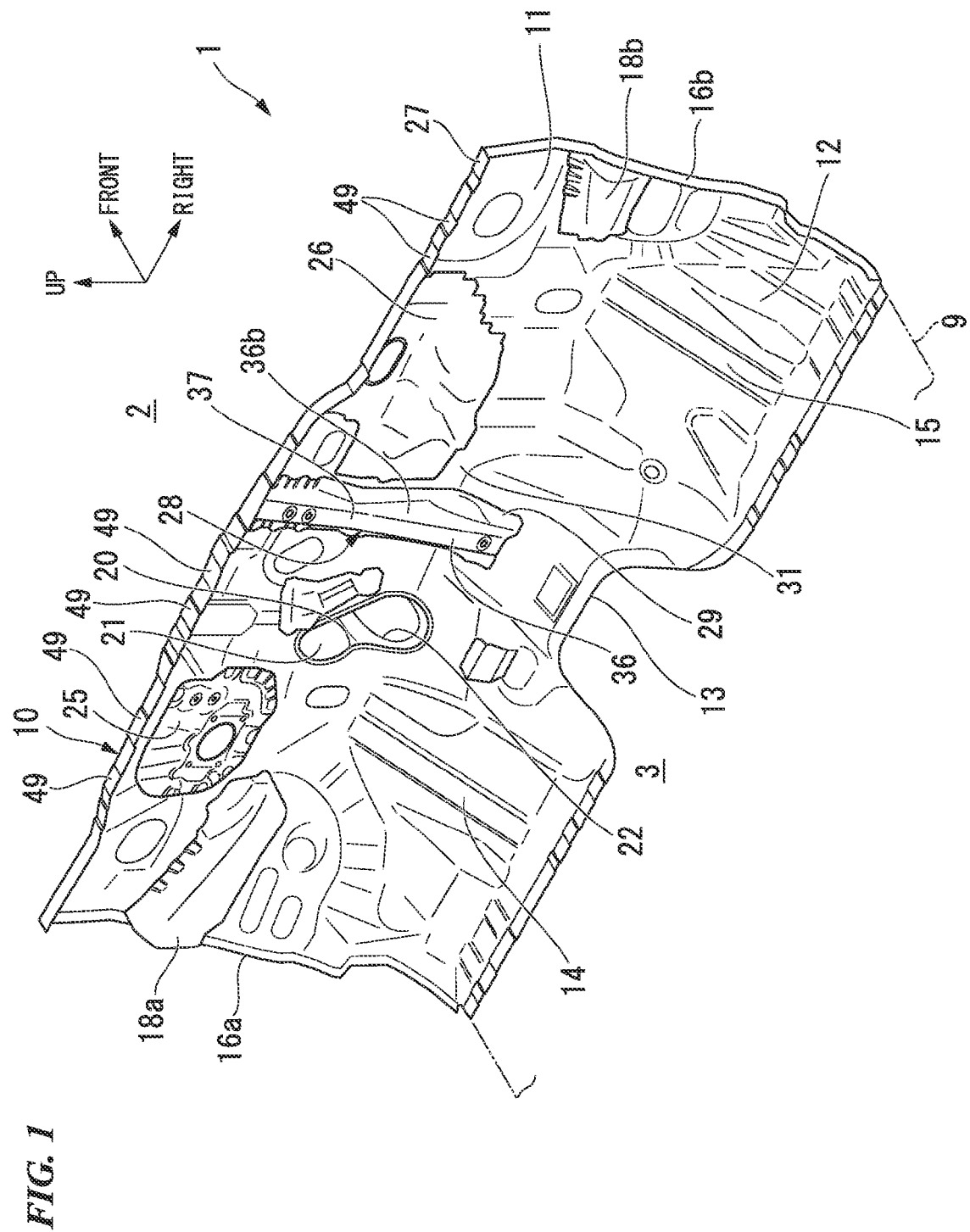
FIG. 1 is a perspective view of a dashboard lower of an embodiment of the invention when seen from a cabin.
Figure 2:
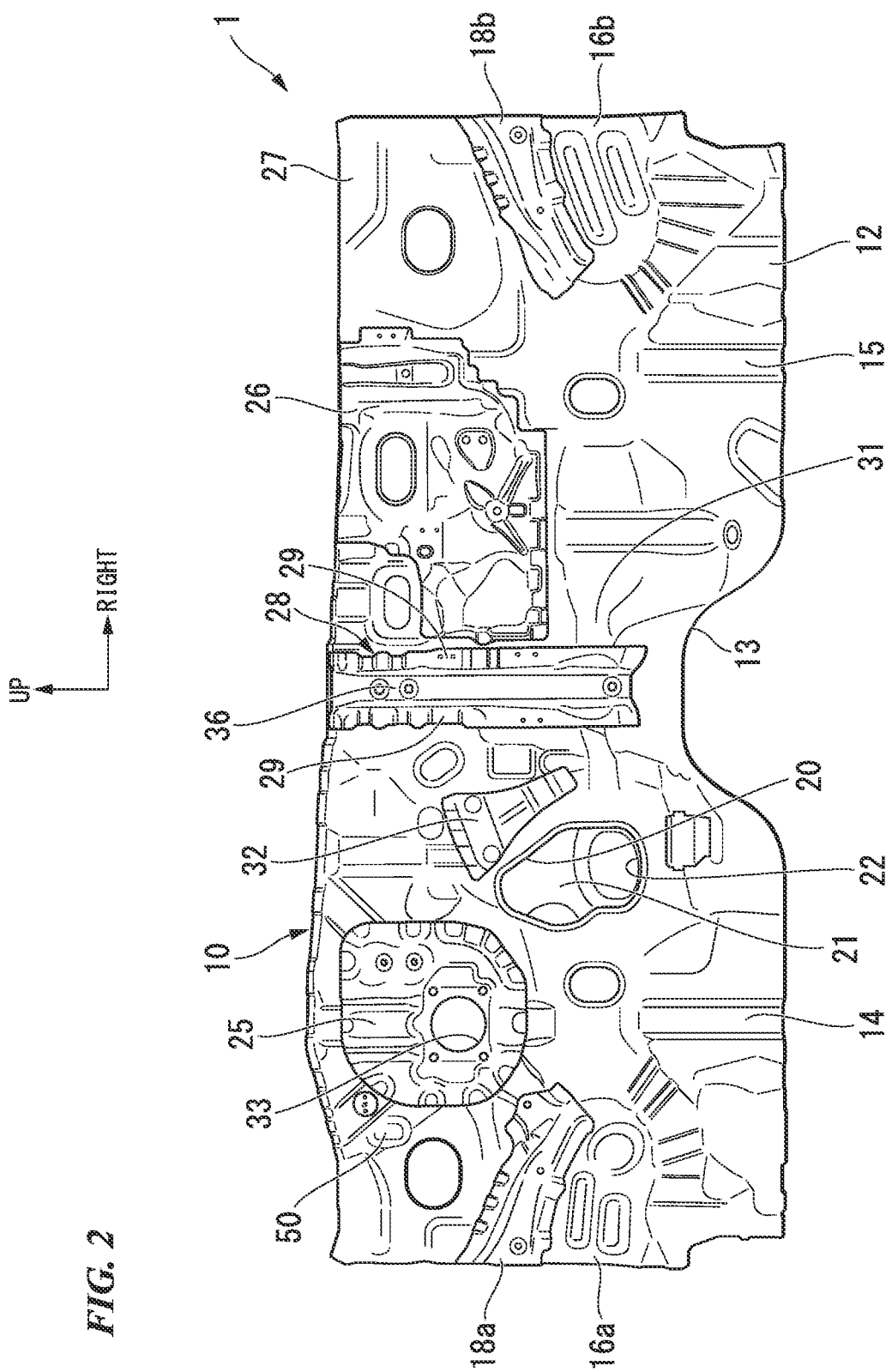
FIG. 2 is a plan view of the dashboard lower of the embodiment of the invention when seen from the cabin.
Figure 3:
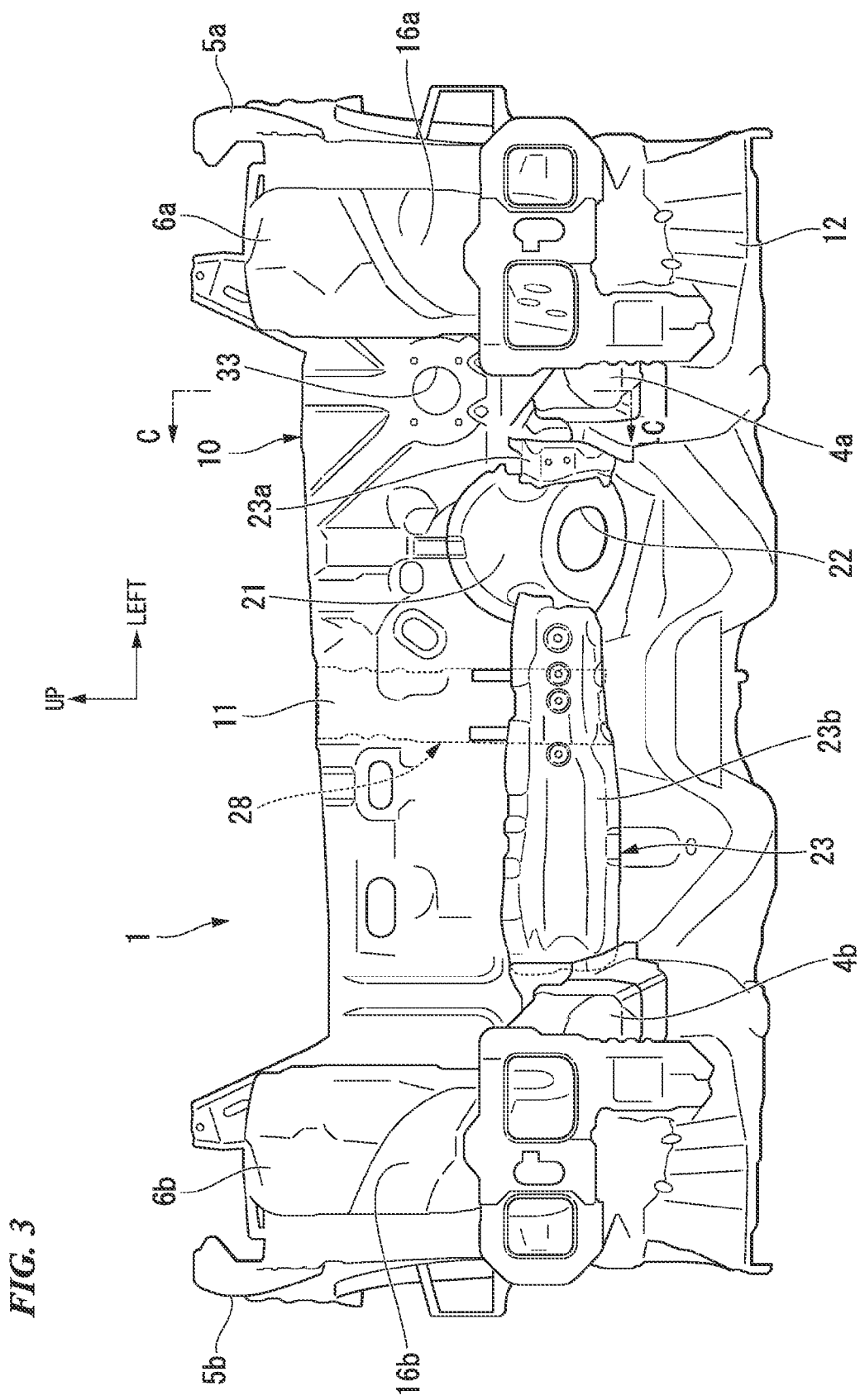
FIG. 3 is a plan view of the dashboard lower of the embodiment of the invention when seen from an engine room.
Figure 4:
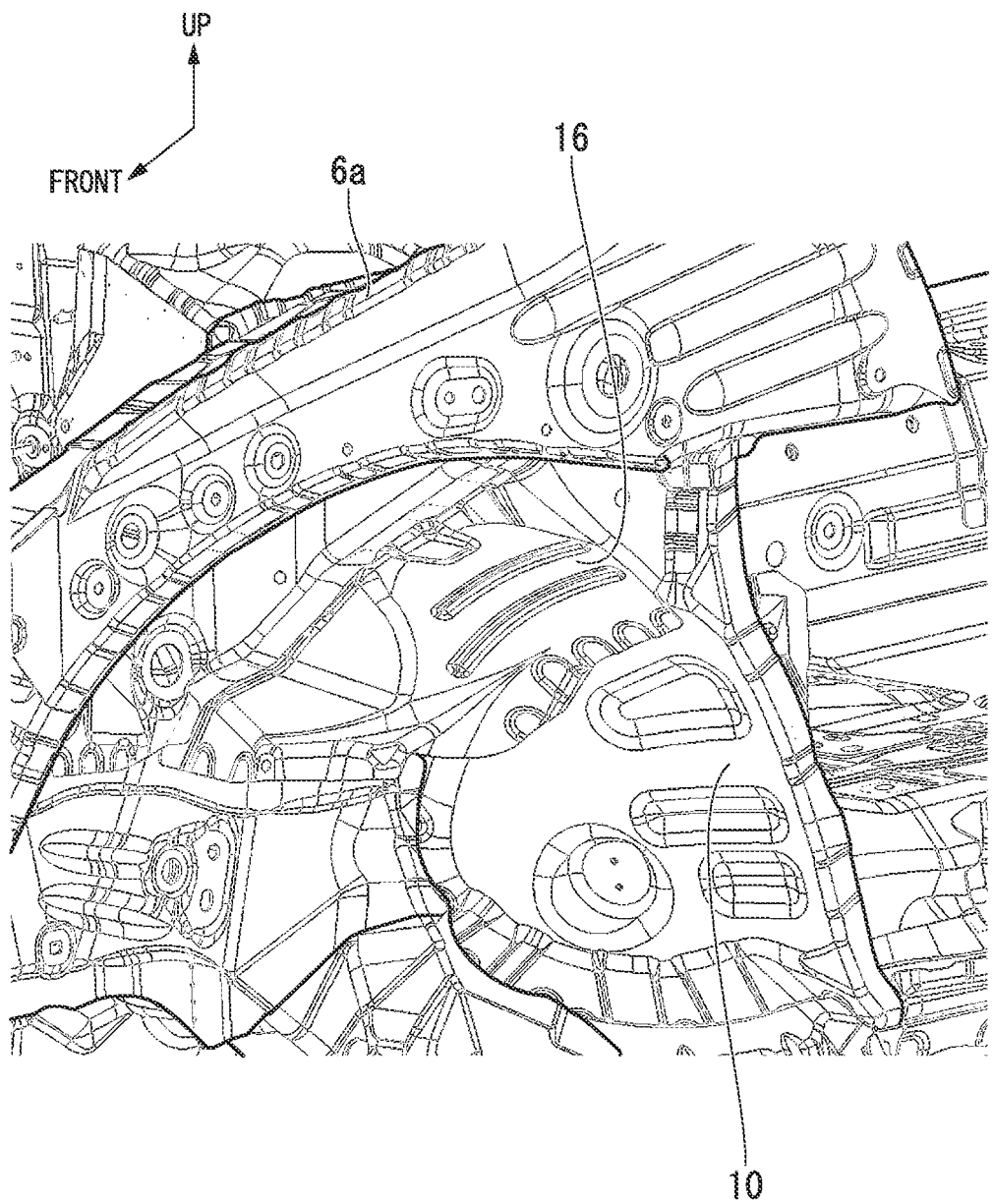
FIG. 4 is a perspective view of a joint portion between the dashboard lower and a wheel house portion of the embodiment of the invention when seen from the outside.

FIG. 1 is a perspective view of a dashboard lower when seen from a cabin. FIG. 2 is a plan view of the dashboard lower when seen from the cabin. FIG. 3 is a plan view of the dashboard lower when seen from an engine room. FIG. 4 is a perspective view of a joint portion between the dashboard lower and a wheel house portion when seen from the outside.

As shown in FIGS. 1 to 4, a vehicle body front structure 1 includes front side frames 4a and 4b, front pillars 5a and 5b, upper members 6a and 6b, a dashboard lower 10, and a floor panel 9. As shown in FIG. 3, the front side frames 4a and 4b are disposed at the front portion of the vehicle body front structure 1 and form left and right frame portions of an engine room 2. The front pillars 5a and 5b are disposed on the rear side and the right and left outsides of these front side frames 4a and 4b and extend in the vertical direction. The upper members 6a and 6b are disposed above both the front side frames 4a and 4b, front ends (first ends) of the upper members 6a and 6b are joined to front ends (first ends) of the front side frames 4a and 4b, and rear ends (second ends) of the upper members 6a and 6b are joined to the front pillars 5a and 5b.

The dashboard lower 10 partitions the engine room 2 from a cabin 3 disposed on the rear side of the engine room 2 and is joined to the front side frames 4a and 4b, the front pillars 5a and 5b, and the upper members 6a and 6b. The floor panel 9 is joined to the lower edge of the dashboard lower 10.

The dashboard lower 10 is formed by performing press working and the like on a metal member having the shape of a flat plate. The dashboard lower 10 includes a vertical wall 11 that extends in the vertical direction and an inclined wall 12 that extends rearward from the lower portion of the vertical wall 11 on a downward slope. Wheel house portions 16a and 16b are provided on both left and right sides of the dashboard lower 10, respectively.

The wheel house portions 16a and 16b are formed to protrude toward the cabin 3, and gussets 18a and 18b are provided at the upper portions of these wheel house portions 16a and 16b, respectively.

Rear ends (second ends) of the front side frames 4a and 4b are joined to end portions of the gussets 18a and 18b, which are close to the middle portion in the width direction of a vehicle, by spot welding with the dashboard lower 10 interposed between the rear ends of the front side frames. On the other hand, the front pillars 5a and 5b are joined to end portions of the gussets 18a and 18b, which are close to the outside in the width direction of the vehicle, by spot welding, respectively.

A bent portion 27, which extends so as to be bent rearward, is formed at the upper edge of the vertical wall 11 of the dashboard lower 10. A plurality of beads 49, which protrude upward and extend in a front-and-rear direction, are formed at the bent portion 27 in the longitudinal direction of the bent portion 27.

On the other hand, a tunnel portion 13, which protrudes upward, is integrally formed in the middle of the inclined wall 12 in the width direction of the vehicle. The left side of the tunnel portion 13 is referred to as a driver's seat-side step portion 14 and the right side of the tunnel portion is referred to as a passenger seat-side step portion 15.

Further, a center frame 28, which extends in the vertical direction, is provided between the tunnel portion 13 and the bent portion 27 of the vertical wall 11. The center frame 28 is a reinforcing member that increases the stiffness of the dashboard lower 10.

A steering opening portion 20, which makes the engine room 2 and the cabin 3 communicate with each other, is formed at a boundary portion of the driver's seat-side step portion 14 between the vertical wall 11 and the inclined wall 12. The steering opening portion 20 is an opening portion into which a steering shaft (not shown) or a universal joint connected to the steering shaft is inserted. A steering joint cover 21, which closes the steering opening portion 20, is mounted on the steering opening portion 20 from the engine room 2.

The steering joint cover 21 has the shape of a cup that is formed to protrude toward the engine room 2, and a joint insertion opening 22 into which a steering shaft (not shown) or a universal joint is inserted is formed at the steering joint cover 21.

Further, dashboard cross-members 23, which extend over the left and right front side frames 4a and 4b, are provided on the surface (first surface) of the dashboard lower 10 facing the engine room 2 at a position corresponding to the steering joint cover 21. The dashboard cross-members 23 are to increase the stiffness of the dashboard lower 10 or to distribute a frontal collision load, and the cross-section of the dashboard cross-member is formed substantially in the shape of a hat. Further, opening sides of the dashboard cross-members 23 are joined to the dashboard lower 10 by spot welding, so that a closed cross-section structure portion is formed.

Furthermore, the dashboard cross-members 23 are divided into left and right members with the steering joint cover 21 interposed therebetween. That is, the dashboard cross-members 23 are formed of a left cross-member 23a and a right cross-member 23b.

Moreover, one end (first end) of each of the left and right cross-members 23a and 23b is joined to the steering joint cover 21 by spot welding. That is, the left and right cross-members 23a and 23b are connected to each other with the steering joint cover 21 interposed therebetween. On the other hand, the other ends (second ends) of the left and right cross-members 23a and 23b are joined to the corresponding left and right front side frames 4a and 4b by spot welding, respectively.

Here, a recess 31, which is long in the left-and-right direction, is formed on the surface (second surface) of the dashboard lower 10, which faces the cabin 3, at a position corresponding to the right cross-member 23b. The dashboard lower 10 is formed to protrude toward the engine room 2, so that the recess 31 is formed. Accordingly, it is possible to further increase the stiffness of the portions of the dashboard lower 10 that correspond to the dashboard cross-members 23.

Further, a damping material fixing panel 26 is provided on the surface (second surface) of the vertical wall 11, which faces the cabin 3, at the right upper portion of the tunnel portion 13. The damping material fixing panel 26 is to fix a melt sheet (not shown) that is attached as a damping material for the dashboard lower 10. Concavity and convexity, which are formed by performing press working and the like on a metal member having the shape of a flat plate, are formed on the damping material fixing panel 26.

Furthermore, an accelerator pedal bracket 32, which is used to mount an accelerator pedal (not shown), is provided on the surface (second surface) of the vertical wall 11, which faces the cabin 3, at the right upper portion of the steering opening portion 20.

Moreover, a brake master cylinder mounting surface 50 on which a brake master cylinder (not shown) is mounted is formed on the vertical wall 11 at the left upper portion of the steering opening portion 20.

Here, the brake master cylinder is to transmit a brake pedal force, which is input through a brake pedal (not shown), to a brake system (not shown) as oil pressure, and is provided with a well-known hydraulic booster (boosting device) (not shown). Further, the brake master cylinder is mounted on the dashboard lower 10 so that the brake master cylinder mounting surface 50 and a master cylinder stiffener 25 to be described below are interposed between the brake master cylinder and the brake pedal.

(Brake Master Cylinder Mounting Surface)

Figure 5:
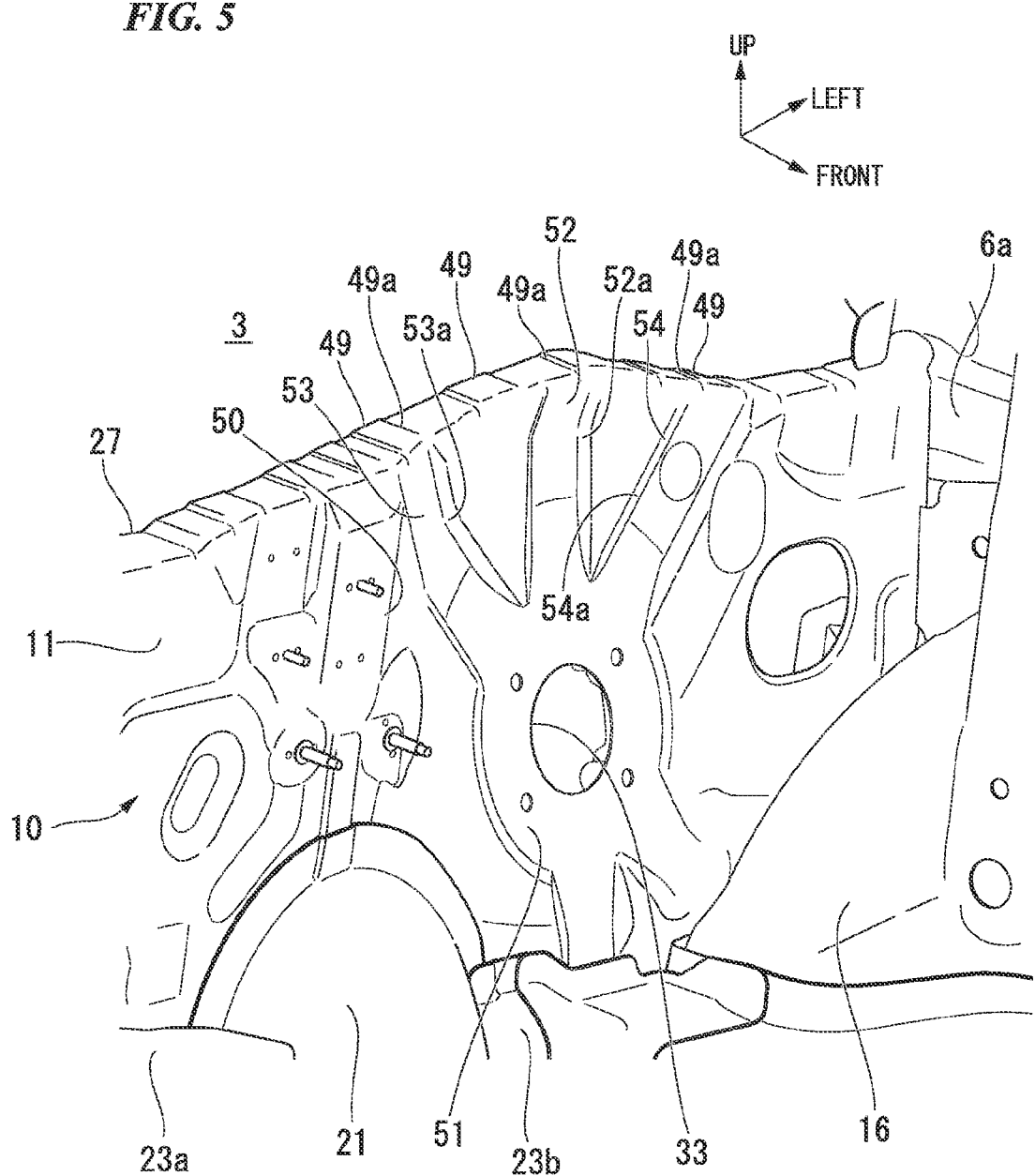
FIG. 5 is a perspective view of a brake master cylinder mounting surface of the embodiment of the invention when seen from the engine room.

FIG. 5 is a perspective view of the brake master cylinder mounting surface when seen from the engine room.

As shown in FIG. 5, the brake master cylinder mounting surface 50 is formed in an arc shape toward the cabin 3 (the vehicle interior), that is, to slightly protrude toward the cabin 3.

A mounting seat surface 51, which has a substantially circular shape in a plane view, is formed at the central portion of the brake master cylinder mounting surface 50 so as to protrude toward the engine room 2. A mounting hole 33 into which the brake master cylinder is inserted is formed at the central portion of the mounting seat surface 51. Here, the brake master cylinder mounting surface 50 is formed in an arc shape so that an apex is positioned at the center of the mounting hole 33.

Further, a vertical bead 52, which protrudes toward the engine room 2, is formed on the brake master cylinder mounting surface 50 on a straight line that passes through the mounting hole 33 and extends in the vertical direction. The vertical bead 52 is formed at the upper and lower portions of the mounting seat surface 51.

Furthermore, first and second inclined beads 53 and 54, which protrude toward the engine room 2, are formed on the brake master cylinder mounting surface 50. The first and second inclined beads 53 and 54 are formed on two straight lines that cross the vertical bead 52 and pass through the mounting hole 33.

The first inclined bead 53 is formed at the upper and lower portions of the mounting seat surface 51. On the other hand, the second inclined bead 54 is formed only at the upper portion of the mounting seat surface 51. Moreover, the mounting seat surface 51 and the beads 52, 53, and 54 are formed so as to be flush with one another.

Further, each of the vertical bead 52 and the first and second inclined beads 53 and 54, which are formed at the upper portion of the mounting seat surface 51, extends so as to reach the bent portion 27 of the dashboard lower 10 from the mounting seat surface 51.

As described above, the number of the beads 52, 53, and 54 formed on the brake master cylinder mounting surface 50, that is, the vertical bead 52, the first inclined bead 53, and the second inclined bead 54 is three. Accordingly, the number of the beads 49, which are formed at the bent portion 27 of the dashboard lower 10, is set to be larger than the number of these beads 52, 53, and 54.

Here, ridgelines 49a of the beads 49 of the bent portion 27, ridgelines 52a of the vertical bead 52, ridgelines 53a of the first inclined bead 53, and ridgelines 54a of the second inclined bead 54 are continuous with one another. A master cylinder stiffener 25 is mounted on the brake master cylinder mounting surface 50, which has this structure, from the cabin 3.

(Master Cylinder Stiffener)

Figure 6:
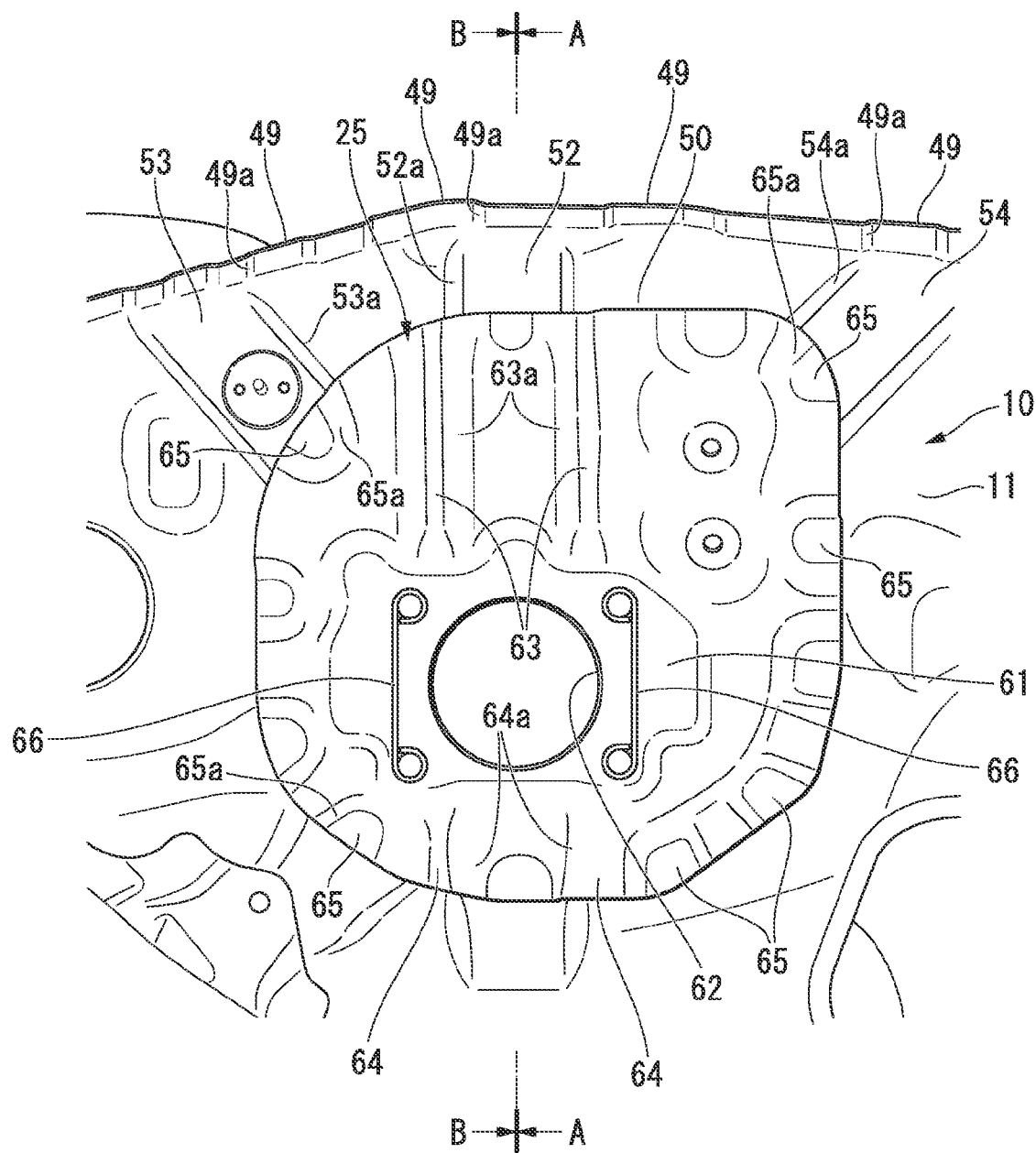
FIG. 6 is a plan view showing a state where a master cylinder stiffener is mounted on the brake master cylinder mounting surface of the embodiment of the invention.
Figure 7:
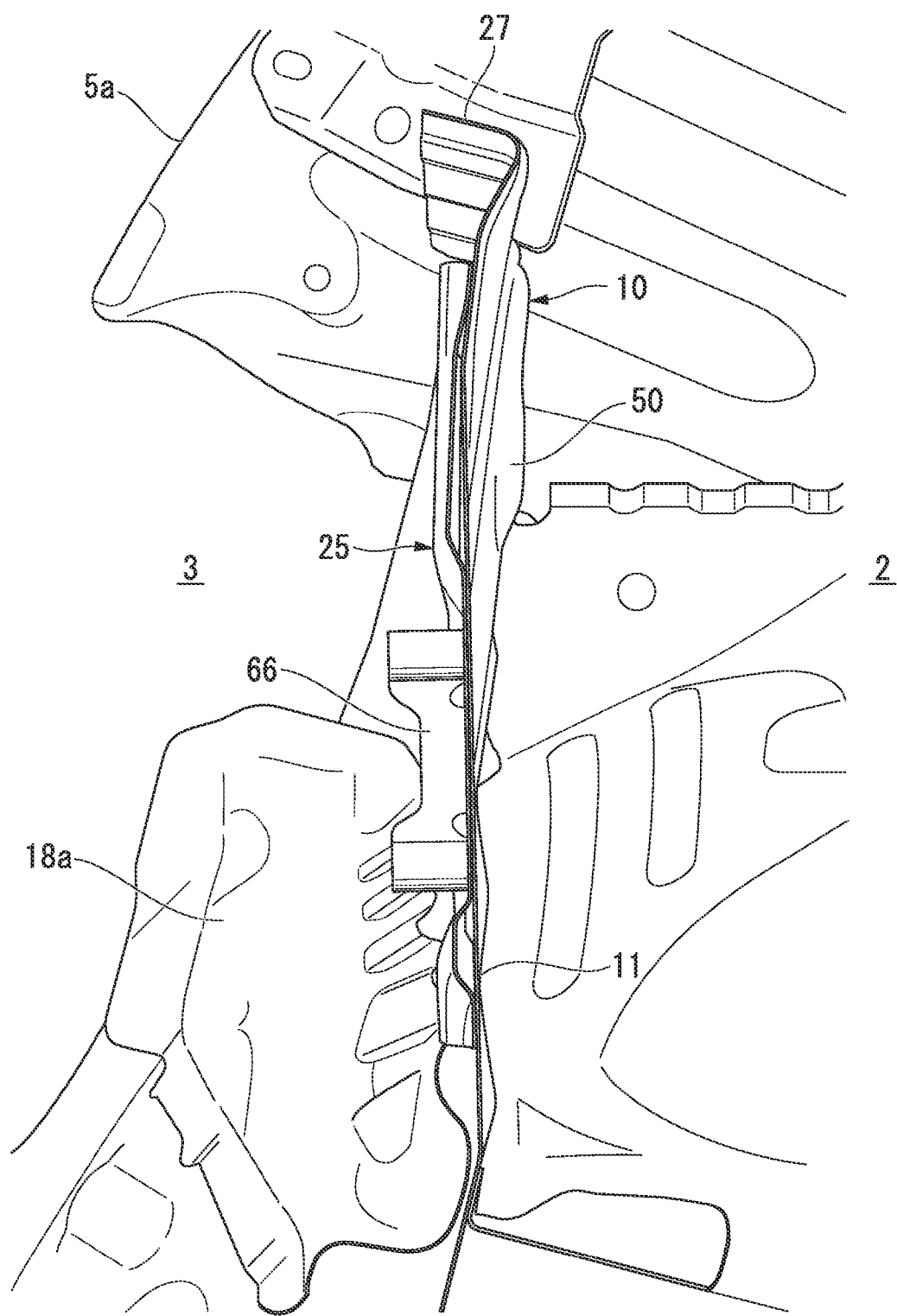
FIG. 7 is a cross-sectional view taken along line A-A of FIG. 6.
Figure 8:
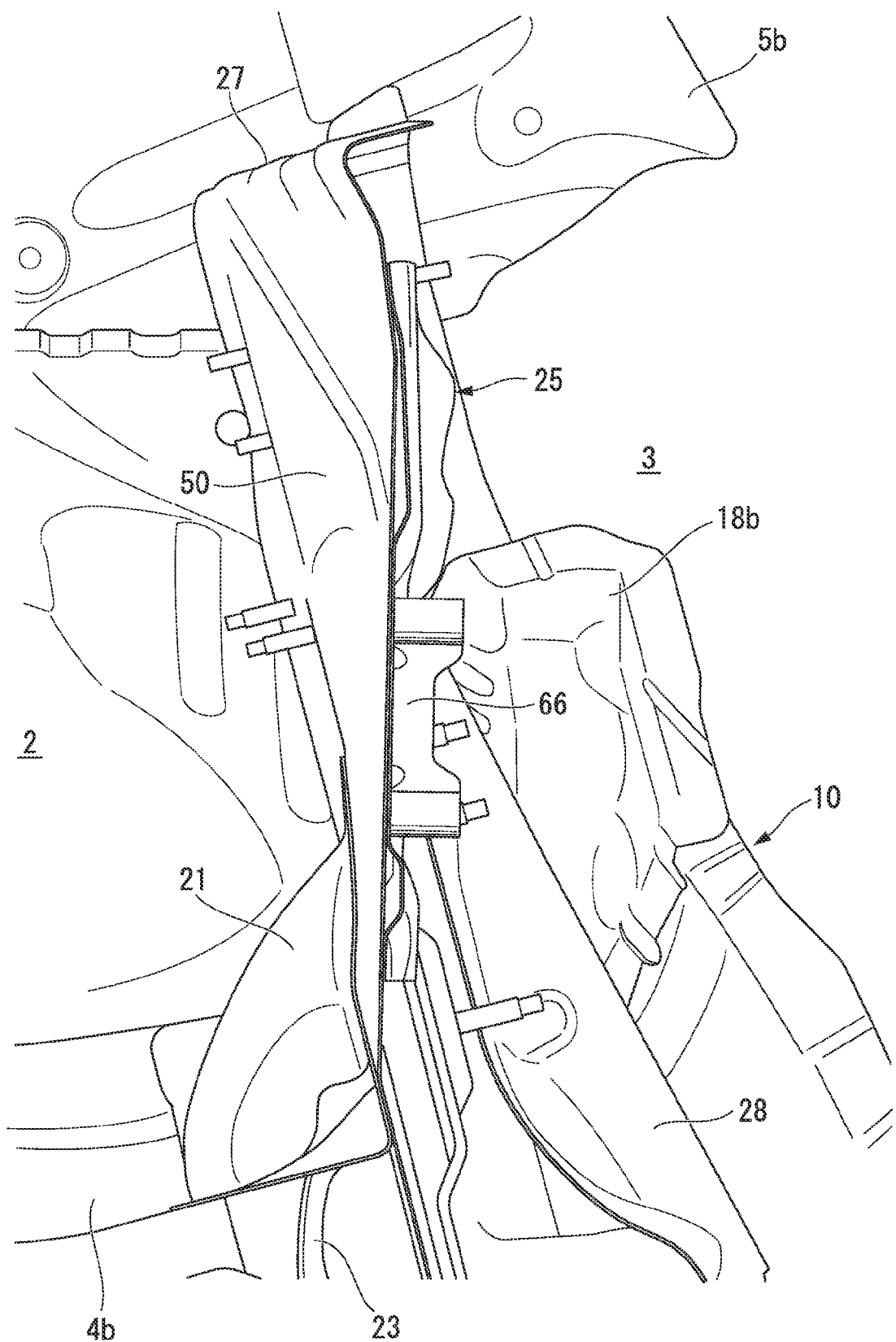
FIG. 8 is a cross-sectional view taken along line B-B of FIG. 6.
Figure 9:
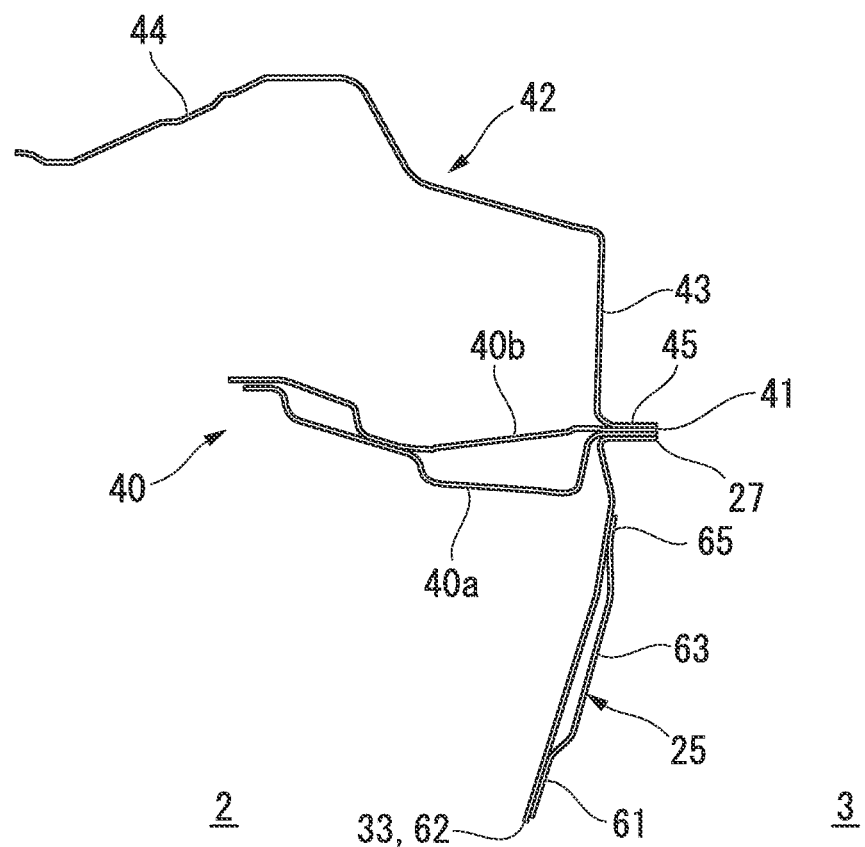
FIG. 9 is a cross-sectional view taken along line C-C of FIG. 3.
Figure 9:
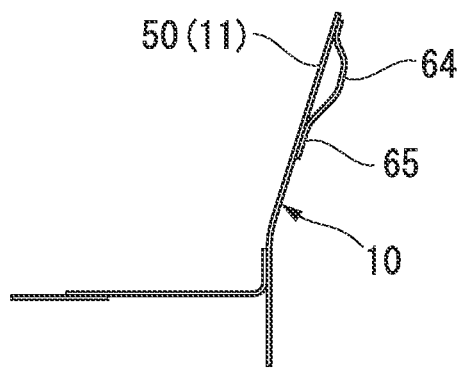

FIG. 6 is a plan view showing a state where the master cylinder stiffener is mounted on the brake master cylinder mounting surface. FIG. 7 is a cross-sectional view taken along line A-A of FIG. 6. FIG. 8 is a cross-sectional view taken along line B-B of FIG. 6. FIG. 9 is a cross-sectional view taken along line C-C of FIG. 3.

As shown in FIGS. 6 to 9, the master cylinder stiffener 25 is a reinforcing plate that increases the support stiffness to mount the brake master cylinder (not shown) on the dashboard lower 10, and is formed by performing press working and the like on a metal member having the shape of a flat plate.

More specifically, the master cylinder stiffener 25 is formed so as to extend over the beads 52, 53, and 54 formed on the brake master cylinder mounting surface 50, and a flat seat surface 61 is formed at the central portion of the master cylinder stiffener 25. A cylinder insertion hole 62, which is concentric with the mounting hole 33 of the brake master cylinder mounting surface 50, is formed on the seat surface 61. The brake master cylinder is inserted into the cylinder insertion hole 62.

Further, brackets 66, which fix the brake master cylinder (not shown), are provided on the seat surface 61 on both left and right sides of the cylinder insertion hole 62.

Furthermore, two upper beads 63, which extend in the vertical direction and protrude toward the cabin 3, are formed at the upper portion of the seat surface 61, and two lower beads, which extend in the vertical direction and protrude toward the cabin 3, are formed at the lower portion of the seat surface 61.

These two upper beads 63 are formed so that ridgelines 63a positioned at the inner portions of the upper beads 63 overlap the ridgelines 52a of the vertical bead 52 formed on the brake master cylinder mounting surface 50. Further, like the upper beads 63, the two lower beads 64 are also formed so that ridgelines 64a positioned at the inner portions of the lower beads 64 overlap the ridgelines 52a of the vertical bead 52.

Furthermore, a plurality of small beads 65 are formed at the outer peripheral edge portion of the master cylinder stiffener 25 so as to protrude toward the brake master cylinder mounting surface 50. Among the plurality of small beads 65, the small beads 65, which are formed at the positions corresponding to the inclined beads 53 and 54 formed on the brake master cylinder mounting surface 50, are formed so that ridgelines 65a of the small beads 65 overlap the ridgelines 53a and 54a of the inclined beads 53 and 54.

As described above, the total number of the respective beads 63, 64, and 65 formed on the master cylinder stiffener 25 is set to be larger than the total number of the beads 52, 53, and 54 formed on the brake master cylinder mounting surface 50. Accordingly, the stiffness of the master cylinder stiffener 25 increases.

Here, as shown in detail in FIGS. 7 and 8, the brake master cylinder mounting surface 50 is formed in an arc shape toward the cabin 3 so that an apex is positioned at the center of the mounting hole 33. Accordingly, a portion of the master cylinder stiffener 25 around the cylinder insertion hole 62 comes into contact with the brake master cylinder mounting surface 50. On the other hand, a gap between the brake master cylinder mounting surface 50 and the master cylinder stiffener 25 is gradually increased toward the outer peripheral edge of the master cylinder stiffener from the seat surface 61.

For this reason, the protrusion height of each of the plurality of small beads 65 is set to a height where the small beads can come into contact with the brake master cylinder mounting surface 50 when the master cylinder stiffener 25 is set on the brake master cylinder mounting surface 50. Further, the small beads 65 are subjected to spot welding, so that the master cylinder stiffener 25 is fixed to the brake master cylinder mounting surface 50. That is, the small beads 65 have not only a function of increasing the stiffness of the master cylinder stiffener 25 but also a function as a weld surface.

In addition, as shown in FIG. 9, the bent portion 27 of the dashboard lower 10 is joined to a dashboard upper assembly 40 by spot welding. The dashboard upper assembly 40 includes a lower panel 40a and an upper panel 40b that are formed by performing press working and the like on a metal member having the shape of a flat plate. The lower and upper panels 40a and 40b are superimposed, so that the dashboard upper assembly 40 forms a closed cross-section structure due to these lower and upper panels 40a and 40b.

A flange portion 41 is formed at the peripheral edge of each of the panels 40a and 40b. These flange portions 41 are superimposed and subjected to spot welding, so that the dashboard upper assembly 40 is formed. Further, the bent portion 27 of the dashboard lower 10 is joined to the flange portion 41 by spot welding.

The bent portion 27 of the dashboard lower 10 is connected to a front glass support panel 42 with the dashboard upper assembly 40 interposed therebetween. The front glass support panel 42 is formed by performing press working and the like on a metal member having the shape of a flat plate. The front glass support panel 42 includes a vertical wall 43 that is formed to be flush with the vertical wall 11 of the dashboard lower 10, and an extension portion 44 that extends so as to be bent forward from the upper edge of the vertical wall 43.

A flange portion 45, which extends so as to be bent rearward, is formed at the lower edge of the vertical wall 43, and the bent portion 27 of the dashboard lower 10 is joined to the flange portion 45 by spot welding with the dashboard upper assembly 40 interposed therebetween.

As described above, the bent portion 27 has a function as a joint portion between the dashboard upper assembly 40 or the front glass support panel 42 and the dashboard lower 10, and the extension length of the bent portion 27 is set to be short.

(Advantageous Effects)

Therefore, according to the above-mentioned embodiment, since the brake master cylinder mounting surface 50 of the dashboard lower 10 is formed in an arc shape toward the cabin 3, it is possible to increase rigidity against a brake pedal force as compared to a case where the brake master cylinder mounting surface 50 is formed flat. In addition, the vertical bead 52 extending in the vertical direction and the first and second inclined beads 53 and 54 extending obliquely are formed on the brake master cylinder mounting surface 50, and beads extending in the left-and-right direction are not formed on the brake master cylinder mounting surface 50. For this reason, it is possible to efficiently increase the rigidity of the dashboard lower 10 and to suppress the bending deformation of the brake master cylinder mounting surface 50 in the vertical direction that is caused by a brake pedal force.

Further, since the master cylinder stiffener 25 is mounted so as to extend over the beads 52, 53, and 54 of the brake master cylinder mounting surface 50 formed as described above, it is possible to reduce the size and weight of the master cylinder stiffener 25.

Furthermore, the bent portion 27, which extends so as to be bent rearward, is formed at the upper edge of the vertical wall 11 of the dashboard lower 10 and the plurality of beads 49, which extend in the front-and-rear direction, are formed at the bent portion 27. Moreover, the ridgelines 49a of these beads 49 and the ridgelines 52a, 53a, and 54a of the beads 52, 53, and 54 of the brake master cylinder mounting surface 50 are continuous with one another (see FIG. 5).

For this reason, it is possible to further increase the rigidity of the bent portion 27, the brake master cylinder mounting surface 50, and the connecting portion between the bent portion 27 and the brake master cylinder mounting surface 50. As a result, it is possible to further increase of the rigidity of the dashboard lower 10.

Further, the beads 63, 64, and 65, which are formed on the master cylinder stiffener 25, are formed so that the ridgelines 63a, 64a, and 65a of the beads 63, 64, and 65 overlap the ridgelines 52a, 53a, and 54a of the beads 52, 53, and 54 formed on the brake master cylinder mounting surface 50. The beads 52 to 65a are superimposed as described above, so that it is possible to further increase the rigidity of the dashboard lower 10.

Furthermore, the beads 52 to 65a are superimposed, so that the master cylinder stiffener 25 and the brake master cylinder mounting surface 50 reliably come into contact with each other. Accordingly, it is possible to transmit a brake pedal force to the brake master cylinder mounting surface 50 through the master cylinder stiffener 25. Here, the bent portion 27 is formed above the brake master cylinder mounting surface 50, and the front glass support panel 42 is joined to the bent portion 27. That is, it is possible to transmit a brake pedal force to the vertical wall 43 of the front glass support panel 42 that has high rigidity. For this reason, it is possible to efficiently distribute a brake pedal force.

In addition, the number of beads 49 formed at the bent portion 27 of the dashboard lower 10 is set to be larger than the number of the beads 52, 53, and 54 formed on the brake master cylinder mounting surface 50. Here, since the extension length of the bent portion 27 is set to be short, the length of each of the beads 49 also becomes short. However, it is possible to further increase the rigidity of the bent portion 27 by increasing the number of the beads 49.

Further, the total number of the beads 63, 64, and 65 formed on the master cylinder stiffener 25 is set to be larger than the total number of the beads 52, 53, and 54 formed on the brake master cylinder mounting surface 50. Here, when the size of the master cylinder stiffener 25 is reduced by the increase of the rigidity of the brake master cylinder mounting surface 50, the length of each of the beads 52, 53, and 54 formed thereon becomes short. However, it is possible to increase the rigidity of the master cylinder stiffener 25 by increasing the number of the beads 52, 53, and 54.

In other cases, the invention is not limited to the above-mentioned embodiment, and also includes embodiments that are obtained by modifying the above-mentioned embodiment in various ways without departing from the scope of the invention.

For example, a case where the dashboard upper assembly 40 to which the bent portion 27 of the dashboard lower 10 is connected is formed through the superimposition of the lower panel 40*a* and the upper panel 40*b* has been described in the above-mentioned embodiment. However, the invention is not limited to this, and a dashboard upper formed of only one metal member having the shape of a flat shape may be used instead of the dashboard upper assembly 40.

Further, a case where metal joining of each portion is performed by spot welding has been described in the above-mentioned embodiment. However, the metal joining is not limited to this, and metal welding methods, which have become well known in the past, such as arc welding, such as TIG (tungsten inert gas) welding, MIG (metal inert gas) welding, and plasma welding, laser welding, and electron beam welding may be appropriately employed.

Furthermore, a case where the ridgelines 49*a* of the beads 49 of the bent portion 27 and the ridgelines 52*a*, 53*a*, and 54*a* of the beads 52, 53, and 54 of the brake master cylinder mounting surface 50 formed on the dashboard lower 10 are continuous with one another has been described in the above-mentioned embodiment. However, the invention is not limited to this, and at least one of beads 52 (53 or 54) of the beads 52, 53, and 54 of the brake master cylinder mounting surface 50 and the ridgelines 49*a* of the beads 49 of the bent portion 27 may be continuous with each other. Even in this case, as compared to the related art, it is possible to further increase the rigidity of the bent portion 27, the brake master cylinder mounting surface 50, and the connecting portion between the bent portion 27 and the brake master cylinder mounting surface 50.

INDUSTRIAL APPLICABILITY

According to the vehicle body front structure of the invention, it is possible to sufficiently increase the support stiffness of a dashboard lower and to reduce the size and weight of a reinforcing plate.

What is claimed is:

1. A vehicle body front structure comprising:
a brake master cylinder mounting surface that is formed on a dashboard lower in an arc shape that is concave toward a vehicle interior, the brake master cylinder mounting surface adapted for a brake master cylinder to be mounted thereon;
a plurality of mounting surface beads that are formed on the brake master cylinder mounting surface only in a vertical direction and an inclined direction inclined with respect to the vertical direction; and
a reinforcing plate that is joined to the plurality of mounting surface beads.

2. A vehicle body front structure comprising:
a brake master cylinder mounting surface that is formed in an arc shape toward a vehicle interior;
a plurality of mounting surface beads that are formed on the brake master cylinder mounting surface only in a vertical direction and an inclined direction inclined with respect to the vertical direction; and
a reinforcing plate that is joined to the plurality of mounting surface beads, wherein
a bent portion, which extends so as to be bent in a front-and-rear direction, is formed at an upper edge of a dashboard lower,
a plurality of bent portion beads are formed at the bent portion, and
ridgelines of at least one of the plurality of bent portion beads continue to ridgelines of at least one of the plurality of mounting surface beads.

3. The vehicle body front structure according to claim 1, wherein
a plurality of reinforcing plate beads are formed on the reinforcing plate, and
ridgelines of the reinforcing plate beads overlap the ridgelines of the mounting surface beads.

4. The vehicle body front structure according to claim 2, wherein
the number of the bent portion beads is set to be larger than the number of the mounting surface beads.

5. The vehicle body front structure according to claim 3, wherein
the number of the reinforcing plate beads is set to be larger than the number of the mounting surface beads.

6. The vehicle body front structure according to claim 1, wherein
a vertical bead that is formed along a straight line extending in a vertical direction and passing through a hole formed on the brake master cylinder mounting surface, and inclined beads that are formed along straight lines crossing the vertical bead and passing through the hole are included in the mounting surface beads.

7. The vehicle body front structure according to claim 2, wherein
the plurality of mounting surface beads extend to the bent portion from the brake master cylinder mounting surface.

8. The vehicle body front structure according to claim 1, wherein
a hole adapted to have the brake master cylinder inserted therethrough is defined at a central portion of a mounting seat surface of the brake master cylinder sleeve, and the brake master cylinder sleeve is formed in an arc shape with an apex positioned at a center of the hole.

9. The vehicle body front structure according to claim 8, wherein
a vertical bead that is formed along a straight line extending in a vertical direction and passing through the hole formed on the brake master cylinder mounting surface, and inclined beads that are formed along straight lines crossing the vertical bead and passing through the hole are included in the mounting surface beads.

10. The vehicle body front structure according to claim 2, wherein
a plurality of reinforcing plate beads are formed on the reinforcing plate, and ridgelines of the reinforcing plate beads overlap the ridgelines of the mounting surface beads.

11. The vehicle body front structure according to claim 10, wherein
the number of the reinforcing plate beads is set to be larger than the number of the mounting surface beads.

12. The vehicle body front structure according to claim 2, wherein
a vertical bead that is formed along a straight line extending in a vertical direction and passing through a hole formed on the brake master cylinder mounting surface, and inclined beads that are formed along straight lines crossing the vertical bead and passing through the hole are included in the mounting surface beads.

13. The vehicle body front structure according to claim 2, wherein
a hole adapted to have the brake master cylinder inserted therethrough is defined at a central portion of a mounting seat surface of the brake master cylinder sleeve, and the brake master cylinder sleeve is formed in an arc shape with an apex positioned at a center of the hole.

14. The vehicle body front structure according to claim 13, wherein
a vertical bead that is formed along a straight line extending in a vertical direction and passing through the hole formed on the brake master cylinder mounting surface, and inclined beads that are formed along straight lines crossing the vertical bead and passing through the hole are included in the mounting surface beads.

15. The vehicle body front structure according to claim 1, wherein
the brake master cylinder mounting surface is formed on the dashboard lower in an arc shape that is concave toward the vehicle interior, and the brake master cylinder mounting surface is adapted for a brake master cylinder to be mounted thereon.

* * * * *